(Model.)
J. QUIGLEY.
Animal Trap.
No. 241,155.   Patented May 10, 1881.
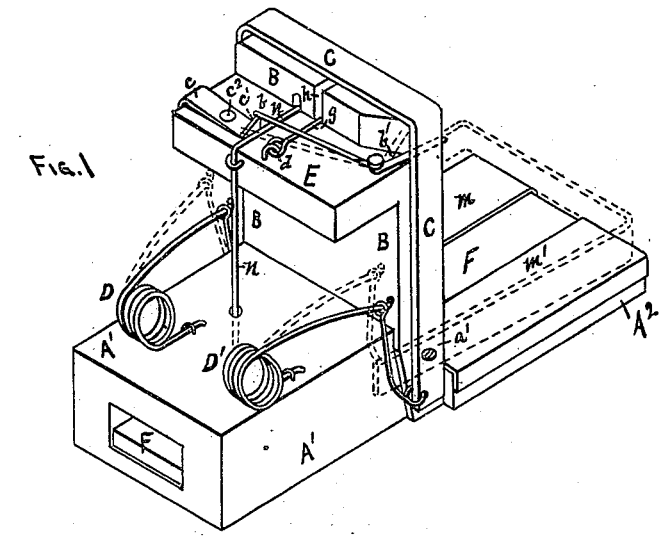
Fig. I
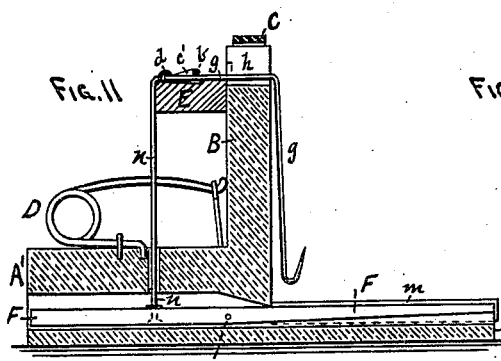
Fig. II
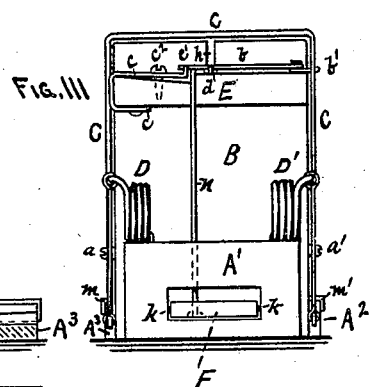
Fig. III
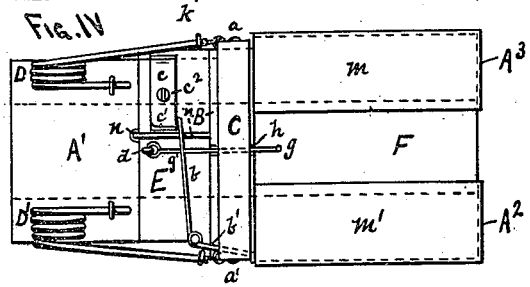
Fig. IV
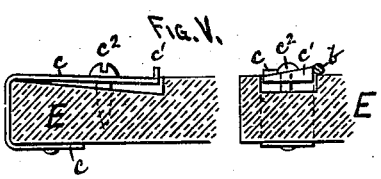
Fig. V
WITNESSES.
Louis Feeser Jr
H. P. Goodenow.
John Quigley.
INVENTOR, BY
Louis Feeser & Bro.
Atty's.

UNITED STATES PATENT OFFICE.

JOHN QUIGLEY, OF MINNEAPOLIS, MINNESOTA.

ANIMAL-TRAP.

SPECIFICATION forming part of Letters Patent No. 241,155, dated May 10, 1881.

Application filed August 16, 1880. (Model.)

*To all whom it may concern:*

Be it known that I, JOHN QUIGLEY, of Minneapolis, in the county of Hennepin and State of Minnesota, have invented certain Improvements in Animal-Traps, of which the following is a specification.

This invention relates to that class of animal-traps in which a spring-operated striking-arm is released by the weight of the animal upon a treadle or by pulling upon a baited hook; and it consists in a striking arm or lever having two jaws and operated by springs, and held poised by a catch or latch whose long arm rests against an adjustable stop, and is adapted to be raised upward by the animal pulling upon the baited hook to release the striking-arm, as hereinafter set forth.

The invention further consists in combining with the treadle for springing the trap a lifting-rod adapted to release the striker-holding catch, as hereinafter set forth.

The invention further consists in forming over the edge of the treadle and front of the platform a double metallic shield, as hereinafter set forth.

The invention further consists in an adjustable stop for holding the striker-catch, whereby the trap may be adapted to different kinds of animals, as hereinafter set forth.

I accomplish these results by use of the mechanism illustrated in the accompanying drawings, in which—

Figure I is a rear perspective view. Fig. II is a longitudinal sectional elevation. Fig. III is a rear elevation. Fig. IV is a plan view, and Fig. V enlarged detail views of the adjustable stop detached.

$A'$ is the base or platform, and B a standard rising from its central part.

C is an arched striking-arm, pivoted at $a$ $a'$ on either side, near the bottom, of the standard B, and a short distance from the lower ends of the striking-arm, and connected by its extreme lower ends, by suitable connecting-rods, to springs D D, so that the springs will exert their force to throw the arched striker downward, as hereinafter shown. The forward ends of the springs D D will be in such a position that when the striker-arm is elevated the line of the strain of the springs will pass nearly through the pivots $a$, so that a very slight power will be required to hold the arm elevated when the trap is set; hence a very slight movement of the tripping mechanism will be sufficient to release the striker.

E is a shelf or bracket projecting from the rear of the standard B, near its top, and upon which a latch or right-angled lever, $b\ b'$, is pivoted, with its short leg $b'$ provided with a toe adapted to catch upon the front of the arm C, while its long leg $b$ is held by a stop, $c'$, as shown. By this means, when the striker C is pulled upward and the latch $b\ b'$ secured in place, as shown, the striker will be held poised.

$g$ is a rod running upward in front of the standard B and backward through a slot, $h$, and beneath the end of the long leg $b$ of the tripping-latch, and is pivoted at $d$ to the bracket E, so that when the lower end is pulled outward the upper part beneath the leg $b$ will be lifted up and throw the latter clear of the stop $c'$, and permit the springs D D' to throw the striker C downward, as shown in dotted lines in Fig. I.

The part of the base $A'$ forward of the standard B is divided into two parts, $A^2$ $A^3$, and with a treadle or lever, F, lying between them and extending backward beneath the standard B, and pivoted at $k$, as shown.

$m$ $m'$ are sheet-metal shields or covers over the sides $A^2$ $A^3$, and arranged to project over the joints between the edges of the treadle F and side pieces, $A^2$ $A^3$, to cover up the cracks thus formed, as well as to provide a metal covering to the base, to prevent the scent of the killed animals remaining to deter others from approaching.

Back of the pivots $k$ of the treadle F a rod, $n$, rises, and is bent over and passed beneath the latch $b$ near the rod $g$, as shown, so that when the treadle F is pressed downward the rod $n$ will raise the latch $b$ and release the striker C. By this means a double-acting trap is produced that may be sprung either by the bait-hook $g$ or treadle F, thus adapting it to animals of different kinds.

With animals of the rat species, whose cunning and caution are largely developed, it is very difficult to trap them with an ordinary trap where the bait is fastened to a tripping-rod, &c.; hence I provide the treadle F, adapted to spring the trap by a very slight pressure.

With animals, however, whose cunning is not so great the baited hook or both the hook and treadle may be used.

The double-sided striker-arm C is a great improvement over the single arm, as it enables me to set the trap without reference to its surroundings, so that no matter from which side the animal comes he is sure to be caught.

The stop consists of a spring-plate, $c$, having one end, $c'$, turned up at right angles in the form of a lip and adapted to be elevated or depressed by a set-screw, $c^2$, so that the height of the stop may be adjusted higher or lower, to shorten or lengthen the distance or increase or decrease the weight it is required to use to spring the trap. Thus, if it is desired to trap mice, young rats, and animals of small size, the plate $c$ will be depressed until the lip $c'$ projects very slightly, so that a very slight movement of the treadle F or hook $g$ will spring it; but if rats and mice both are in the vicinity of the trap, and it is desired to catch only the former, the lip $c'$ is elevated and the hook $g$ left unbaited and the bait spread loosely upon the treadle and platform, so that mice and young rats may run over the treadle without moving it sufficiently to spring the trap, which will only be sprung by the heavier weight of the rat. Then when the rats are all caught the trap may be adjusted for the mice, &c. By this means the trap may be adjusted for any kind of animal.

What I claim as new is—

1. The combination, with the double-sided striker C, formed as described, and provided with springs D D', of the latch $b\ b'$, stop $c'$, and bait-hook $g$, substantially as set forth.

2. The combination and arrangement of the double-sided striker C, adapted to be operated by the springs D D', of the adjustable stop $c$ $c'$, set-screw $c^2$, latch $b\ b'$, rod $n$, and treadle F, substantially as set forth.

3. In an animal-trap, the combination, with the striker-arm C, having a tripping-catch adapted to release the striker by the weight of the animal to be caught, of a stop, $c\ c'$, and set-screw $c^2$, capable of being adjusted higher or lower, to regulate the degree of force required to spring the trap, substantially as set forth.

4. The combination and arrangement of the treadle F, sides $A^3\ A^2$, and metal shields $m\ m'$, substantially as set forth.

In testimony whereof I have hereunto set my hand in the presence of two subscribing witnesses.

JOHN QUIGLEY.

Witnesses:
LOUIS FEESER,
C. N. WOODWARD.